(12) United States Patent
Yamada et al.

(10) Patent No.: US 7,058,303 B2
(45) Date of Patent: Jun. 6, 2006

(54) OPTICAL CROSS-CONNECTING DEVICE

(75) Inventors: Ryo Yamada, Tokyo (JP); Soichiro Araki, Tokyo (JP); Yoshihiko Suemura, Tokyo (JP); Yoshiharu Maeno, Tokyo (JP); Itaru Nishioka, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 706 days.

(21) Appl. No.: 10/003,653

(22) Filed: Nov. 2, 2001

(65) Prior Publication Data

US 2002/0054407 A1 May 9, 2002

(30) Foreign Application Priority Data

Nov. 8, 2000 (JP) ....................................... 2000-339800

(51) Int. Cl.
*H04J 14/00* (2006.01)

(52) U.S. Cl. ............................................ 398/50; 398/48
(58) Field of Classification Search .................. 398/45, 398/46, 47, 48, 49, 50, 51, 55, 56, 57
See application file for complete search history.

(56) References Cited

U.S. PATENT DOCUMENTS

| 5,450,224 | A | | 9/1995 | Johansson | ..................... 398/50 |
| 6,005,697 | A | * | 12/1999 | Wu et al. | ..................... 398/48 |
| 6,493,119 | B1 | * | 12/2002 | Kuo et al. | ..................... 398/49 |
| 6,567,429 | B1 | * | 5/2003 | DeMartino | ..................... 370/539 |

FOREIGN PATENT DOCUMENTS

| JP | 6-6844 | 1/1994 |
| JP | 6-303192 | 10/1994 |
| JP | 2000-134649 | 5/2000 |

OTHER PUBLICATIONS

Noirie et al. "Multi–granularity Optical Cross–Connect," ECOC 2000. Sep. 3–7, 2000. Proceedings of 26th European Conference on Optical Communication, vol. 3, pp. 269–270.*
Jue et al. "A New Node Architecture for Scalable WDM Optical Networks," ICC '99. Jun. 6–10, 1999. IEEE International Conference on Communications, 1999, vol. 3, pp. 1714–1718.*
Harada et al. "Hierarchical Optical Path Cross–Connect Systems for Large Scale WDM Networks." Feb. 1999. Optical Fiber Communication Conference OFC/IOOC '99, Technical Digest, vol. 2, pp. 356–358.*
Copy of Japanese Office Action dated Jun. 14, 2005 (and English translation of relevant portion).

* cited by examiner

*Primary Examiner*—Jason Chan
*Assistant Examiner*—Christina Y. Leung
(74) *Attorney, Agent, or Firm*—Dickstein, Sharpiro, Morin & Oshinsky, LLP

(57) ABSTRACT

An optical cross-connecting device is small in scale of a switch even when a wavelength multiplexed signal to be transmitted through an optical fiber is high density and wide range. Switching of the wavelength multiplexed signals is performed in a first optical switch, switching per wavelength group in a second optical switch is performed for only signals required switching for smaller granularity, and switching per wavelength signals in a third optical switch is performed for only signals required switching for smaller granularity to from the opticall cross-connecting device. By this, even when the wavelength multiplexed signal to be transmitted through the optical fiber is high density and wide band, the optical cross-connecting device can be small in scale of a switch.

4 Claims, 17 Drawing Sheets

OPTICAL CROSS-CONNECTING DEVICE

BACKGROUND OF THE INVENTION

1. Field of the Invention

The present invention relates generally to an optical cross-connecting device. More particularly, the invention relates to an optical cross-connecting device performing switching of a plurality of wavelength multiplexed signals and adding/dropping of the signal.

2. Description of the Related Art

FIG. 12 is a block diagram showing a construction of the typical conventional optical cross-connecting device. In FIG. 12, a plurality of the wavelength multiplexed signals input from a plurality of optical fibers 101 of a plurality of transmission paths is divided into individual unity wavelength signals by respective of corresponding wavelength demultiplexers 102. In this case, for example, respective of a plurality of wavelength multiplexed signals are respectively multiplexed signals of a hundred sixty unit wavelength signals respectively having wavelength $\lambda 1$ to $\lambda 160$. Each optical demultiplexer 102 has a function for dividing the corresponding wavelength multiplexed signal into hundred sixty unity wavelength signals.

Then, the wavelength signals divided by a plurality of optical demultiplexers 102 are subject to switching per wavelength signal by an optical switch 103 and to adding/dropping process of the signal (termination of the signal), per respective wavelength $\lambda 1$ to $\lambda 160$. Then, again, the wavelength signals are multiplexed by respective of optical multiplexers 104 into a plurality of wavelength multiplexed signals to be output from optical fibers 105 of a plurality of transmission paths.

The foregoing system is constructed for enabling switching of all wavelength signals to inherently make scale of switch huge to cause difficulty in realization in technical and economical point of view. Also, when large proportion of wavelength signals pass through as they are and only quite limited number of signals are to be switched and added/dropped, such system is quite inefficient.

Next, when the wavelength band to be used becomes high density and wide range, in view point of characteristics of transmission and difficulty in production of the wavelength demultiplexers and wavelength multiplexers adapted for the high density and wide range and for other reason, the filtering and multiplexing method of the wavelength to demultiplex or multiplex all of the wavelength multiplexed signals in the lump like as 102 and 104 as shown in FIG. 12 is less practical. Instead, as shown in FIG. 13, a demultiplexing method to once divide the wavelength multiplexed signal into a plurality of wavelength groups by a wavelength group demultiplexer 111, and then divide each wavelength group into individual wavelength signals by wavelength demultiplexers 112-1 to 112-U, may be employed. And a multiplexing method to once multiplex the individual wavelength signals into a plurality of wavelength groups by wavelength multiplexers 113-1 to 113-U and then multiplex a plurality of the wavelength groups into the wavelength multiplexed signal by a wavelength group multiplexer, may be employed.

As a method for forming the wavelength group various methods, such as a method to aggregate wavelength signals having close wavelengths into the same group as shown in FIG. 14A, a method to aggregate the wavelength signals having the same period relative to a wavelength axis into the wavelength group as shown in FIG. 14B, a method to combine the methods in FIGS. 14A and 14B, and other method, may be considered. (In FIGS. 14A, 14B and 14C, the same pattern means belonging in the same wavelength group.)

FIG. 15 shows an example of the case of forming the wavelength group from a band which can be amplified by an optical amplifier, as forming method of the wavelength group. The shown example is directed to the case where the amplifier capable of amplifying all bands of a hundred sixty waves having wavelengths of $\lambda 1$ to $\lambda 160$ cannot be produced. In such case, the wavelength multiplexed signal containing wavelengths $\lambda 1$ to $\lambda 160$ is divided into a wavelength group of eighty waves having wavelengths $\lambda 1$ to $\lambda 80$ and a wavelength group of eighty waves having wavelengths $\lambda 81$ to $\lambda 160$ to have two wavelength groups, by the wavelength demultiplexer 111. It should be noted that amplifiers 121 and 122 are optical amplifiers having foregoing bands to be amplified. An example forming the wavelength group from the characteristics of the amplifier shown in FIG. 15 is the example illustrated in FIG. 14A.

On the other hand, FIG. 16 shows the case where the wavelength group is formed from the characteristics of the wavelength demultiplexer or wavelength multiplexer. When all intervals of each wavelengths $\lambda 1$ to $\lambda 160$ are 0.4 nm as shown in FIG. 16B, a wavelength multiplexer multiplexing a light beam having wavelengths $\lambda 1$ to $\lambda 160$ obtained from transmitters 130-1 to 130–160 in a lump, is technically difficult. Namely, as the wavelength multiplexer 131, a filter having band pass characteristics permitting respective wavelengths $\lambda 1$ to $\lambda 160$ at interval of 0.4 nm has to be used as shown in FIG. 14B.

However, in practice, filter having such band pass characteristics is difficult to realize. Therefore, as shown in FIG. 16C, two filters having pass band of 0.8 nm interval are used so that one filter passes odd number order of wavelengths $\lambda 1, \lambda 3, \ldots$, and the other filter passes even number order of wavelengths $\lambda 2, \lambda 4, \ldots$ to form the wavelength group. This example is the example illustrated in FIG. 14B.

In case of the construction as shown in FIG. 13, the wavelength signal passes through multiple stages of wavelength demultiplexers/multiplexers or through wavelength group demultiplexers/multiplexers, as one kind of optical filter, to cut spectrum component to increase signal degradation.

FIG. 17 is a block diagram showing another construction of the typical conventional optical cross-connecting device. Wave lengths of respective of individual wavelength signals demultiplexed by wavelength demuliplexers 102 are converted into the same wavelength (e.g. $\lambda 0$) by respective wavelength converters 121. These wavelength signals of the same wavelength are input to an optical switch 122 to be switched per individual signal or added/dropped the signal therein. The individual signals output from the optical switch 122 are input to each wavelength converters 123 to be converted into each individual wavelength signals by the wavelength converters 123. (It should be noted that, in the wavelength converter, certain wavelength signal is once converted into an electric signal and then converted into the wavelength signal having wavelength $\lambda 0$.) The individual wavelength signals output from the wavelength converters 123 are multiplexed by the optical wavelength multiplexers 104 and output from optical fibers 105 of a plurality of transmission paths.

It should be noted that, in FIG. 17, when 121 are optical receivers, each individual electric signal photoelectric converted by the optical receivers 121 are input to the electrical switch 122. By the electrical switch 122, switching per individual electrical signal or add/drop of the signal are performed. The individual signals output from the electrical switch 122 are input to respective optical transmitters 123, and converted into individual wavelength signals by the optical transmitters 123. The individual wavelength signals output from the optical transmitters 123 are multiplexed by the optical wavelength multiplexers 104 to be output from optical fibers 105 of a plurality of transmission paths.

In such construction, the optical signals input from the optical fibers 101 of a plurality of transmission paths are once converted into the electrical signals (as set forth above, even in wavelength conversion process, the signals are once converted). Therefore, signal degradation by passing a plurality of stages of filters can be restricted. However, similarly to the construction of FIG. 12, scale of the switch is large to cause technical and economical difficulty in practicing. Since the wavelength converters and the optical transmitters/receivers are required for all signals, scale and cost for the system can be further increased.

On the other hand, when large proportion of wavelength signals pass through as they are and only quite limited number of signals are to be switched and added/dropped, such system is quite inefficient similarly to the construction shown in FIG. 12. Namely, in case of switching equipment in small or middle size city, large proportion of signals are simply relayed to the switching equipment in the next city, and terminal process, such as switching or adding/dropping for such signals is not required. Despite of this fact, conversion of the signal per wavelength is performed for all signals.

As set forth above, the conventional optical cross-connecting device is large in scale of the switch for demultiplexing and multiplexing the overall wavelengths to be technically and economically difficult to realize. Also, when large proportion of wavelength signals pass through as they are and only quite limited number of signals are to be switched and added/dropped, such as in the case of the switching equipment in small and medium size city, such system is quite inefficient. Further problem is also encountered in signal degradation by passing the optical signal through plurality of stages of wavelength group demultiplexer and multiplexer or wavelength demultiplexer/multiplexer, and the scale and cost of the system are increased by employment of the wavelength converters and optical transmitters/receivers for all of the wavelength signals.

SUMMARY OF THE INVENTION

The present invention has been worked out in view of the drawbacks in the prior art. It is therefore an object of the present invention to provide an optical cross-connecting device which is small in scale of a switch even when a wavelength multiplexed signal to be transmitted through an optical fiber is high density and wide range.

Another object of the present invention is to provide an optical cross-connecting device which can reduce number of optical filters, such as wavelength group demuliplexers/multiplexers and wavelength demuliplexers/multiplexers to pass an optical signal for restricting signal degradation.

According to the first aspect of the present invention, an optical cross-connecting device for switching wavelength multiplexed signals input from a plurality of optical fibers, comprises:

switching means for switching per only wavelength group for a part of a plurality of said wavelength multiplexed signals.

The switching means may switch per wavelength signal only for a part of wavelength group after switching per the wavelength groups.

The switching means may comprise a first optical switch for switching per the wavelength multiplexed signal for the wavelength multiplexed signals input from a plurality of the optical fibers; first wavelength group demuliplexers for dividing a part of a plurality of wavelength multiplexed signals output from the first optical switch into a plurality of wavelength groups; and second optical switches for switching per wavelength group for the divided wavelength groups. The switching means may further comprise wavelength demultiplexers for dividing a part of a plurality of the wavelength groups into individual wavelength signals output from the second optical switches and third optical switches for switching per wavelength signal and adding/dropping for individual wavelength signals output from the wavelength demultiplexers. The switching means may further comprises wavelength multiplexer for multiplexing individual wavelength signals output from the third optical switches into wavelength groups to input to the second optical switches and first wavelength group multiplexers for multiplexing wavelength groups other than the part of the wavelength groups output from the second optical switches into single wavelength multiplexed signal to input to the first optical switch. The wavelength demultiplexers, the third optical switches and the wavelength multiplexers may be provided only for particular kind of wavelength group among a plurality of wavelength groups output from the second optical switches.

According to the second aspect of the present invention, an optical cross-connecting device for switching wavelength multiplexed signals input from a plurality of optical fibers, comprises:

switching means for performing switching per wavelength group for a plurality of the wavelength multiplexed signals and switching per only wavelength group for a part of a plurality of wavelength groups after switching.

The switching means may comprises first wavelength group demuliplexers for dividing wavelength multiplexed signals input from a plurality of the optical fibers into a plurality wavelength groups, second optical switches for switching per wavelength group for a part of a plurality of divided wavelength groups, wavelength demultiplexers for dividing a part of the wavelength groups output from the second optical switches into respective of individual wavelength signals and third optical switches for switching per wavelength signal and adding/dropping for the individual wavelength signals output from the wavelength demultiplexers.

The switching means may further comprise wavelength multiplexers for multiplexing the individual wavelength signals output from the third optical switches into wavelength groups to input to the second optical switches and first wavelength group multiplexers for multiplexing wavelength groups other than a part of wavelength groups output from the second optical switches into single wavelength multiplexed signal. The switching means comprises first wavelength converters for converting each individual wavelength signal output from the wavelength demultiplexers into a wavelength signal of the same wavelength and inputting to the third optical switch and second wavelength converters for converting a plurality of wavelength signals of the same wavelength output from the third optical switches into wavelength signals of different wavelengths to output to the wavelength multiplexers.

The switching means may comprise electrical switches as replacement for the third optical switches, optical receivers for converting individual wavelength signals output from the wavelength demultiplexers into electric signals to input to the electrical switches, and optical transmitters for converting individual electric signals output from the electrical switches into individual wavelength signals and outputting to the wavelength multiplexers.

The switching means may comprises a first optical switch for switching per the wavelength multiplexed signal for the wavelength multiplexed signals input from a plurality of optical fibers, first wavelength group demultiplexers for dividing wavelength multiplexing signals input from a plurality of the optical fibers into a plurality wavelength groups having a first granularity, second optical switches for switching per wavelength group for said wavelength groups having the first granularity output from the first wavelength group demultiplexers, second wavelength group demultiplexers for dividing a part of a plurality of wavelength groups output from the second optical switches into a plurality of wavelength groups having a second granularity smaller than the first granularity, fourth optical switches for switching per wavelength group for a part of a plurality of wavelength groups output from the second wavelength group demultiplexers, wavelength demultiplexers for dividing a part of plurality of wavelength groups output from the fourth optical switches into respective indicative wavelength signals and third optical switches for switching per wavelength signal and adding/dropping for individual wavelength signals output from the wavelength demultiplexers.

The switching means may further comprise wavelength multiplexers for multiplexing individual wavelength signals output from the third optical switches into wavelength groups having the second granularity to input to the fourth optical switches, second wavelength group multiplexers for multiplexing wavelength groups other than a part of wavelength groups output from the fourth optical switches into wavelength groups having the first granularity to input to the second optical switches, and first wavelength group multiplexers for multiplexing the wavelength group other than the part of the wavelength groups and output from the second optical switches into single wavelength multiplexed signals to input to the first optical switch.

In the first, second and third optical switches, optical fibers not required switching may be aggregated into a group for performing switching per group.

In the operation, in the first optical switch, switching per wavelength multiplexed signal is performed, and switching per wavelength group is performed in the second optical switch only for the signal required switching for smaller granularity. Switching per the wavelength signal is performed in the third optical signal required switching for smaller granularity to enable construction of the optical cross-connecting device of smaller switch scale even when the wavelength multiplexed signal to be transmitted through the optical filer is high density and wide band. Also, number of optical filters, such as wavelength group demultiplexer/multiplexer or wavelength demultiplexer/multiplexer, to pass the optical signal, can restrict degradation of the signal.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiments of an optical cross connector of the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
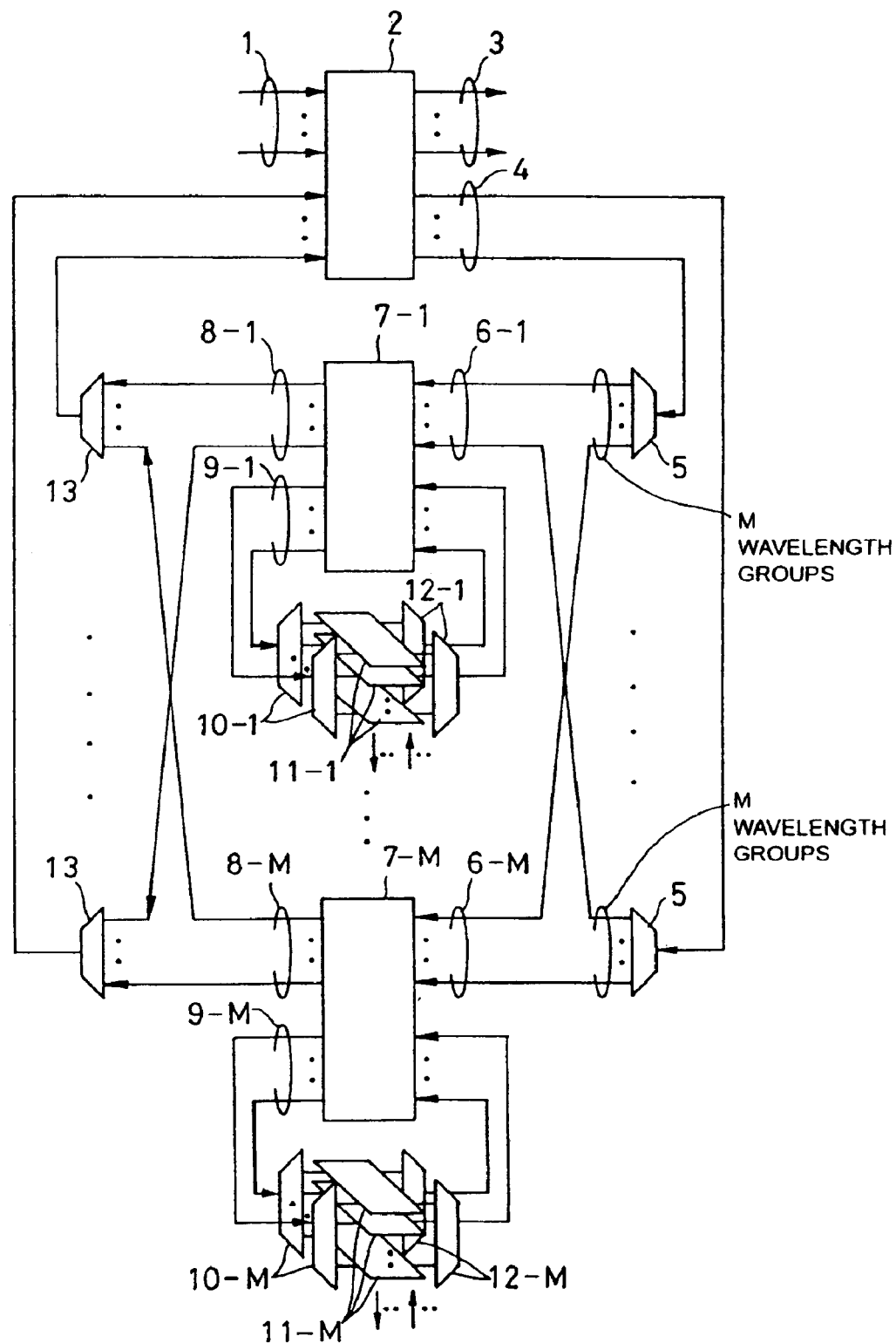
FIG. 1 is a block diagram showing the first embodiment of an optical cross-connecting device according to the present invention.

FIG. 1 is a block diagram showing the first embodiment of an optical cross connector according to the present invention. Wavelength multiplexed signals input from a plurality of optical fibers 1 of transmission paths are switched per a wavelength multiplexed signal by a first optical switch 2 and are output to a plurality of optical fibers 3 of the transmission paths. By this, the wavelength multiplexed signals merely passing through or the wavelength multiplexed signals only transmitting the optical fiber can pass or transit in the form of the wavelength multiplexed signal.

Among a plurality of wavelength multiplexed signals output from the first optical switch 2, only wavelength multiplexed signals necessary to be switched at smaller granularity (degree of wavelength band) than that of the wavelength multiplexed signals input from the optical fibers 1 are output to a plurality of optical fibers 4 and divided into M in number of wavelength groups by respective first wavelength group demultiplexers 5. First wavelength group 6-1, ..., (M)th wavelength group 6-M output from the first wavelength group demultiplexers 5 are respectively input to second optical switches 7-1 to 7-M to be switched per wavelength group to be output to optical fibers 8-1 to 8-M. By this, switching of the signal having smaller granularity than that of the wavelength multiplexed signals input from the optical fibers 1 but greater granularity than that of the wavelength signals becomes possible.

Among the wavelength groups output from the second optical switches 7-1 to 7-M, only wavelength groups necessary to be switched per wavelength signal are output to the optical fibers 9-1 to 9-M to be input to respective wavelength demuliplexers 10-1 to 10-M to be divided in to each individual wavelength signal. Individual wavelength signals output from the wavelength demuliplexers 10-1 to 10-M are input to respective third optical switches 11-1 to 11-M to be switched per wavelength signal and adding/dropping of the signal.

Individual wavelength signals output from the third optical switches 11-1 to 11-M are multiplexed into wavelength groups and then input to the second optical switches 7-1 to 7-M to be output to the optical fibers 8-1 to 8-M. A plurality of wavelength groups output from the optical fibers 8-1 to 8-M are multiplexed into wavelength multiplexed signals by the first wavelength group multiplexers 13 to be input to the first optical switch 2 and then output to a plurality of optical fibers 3 of the transmission paths.

Figure 2:
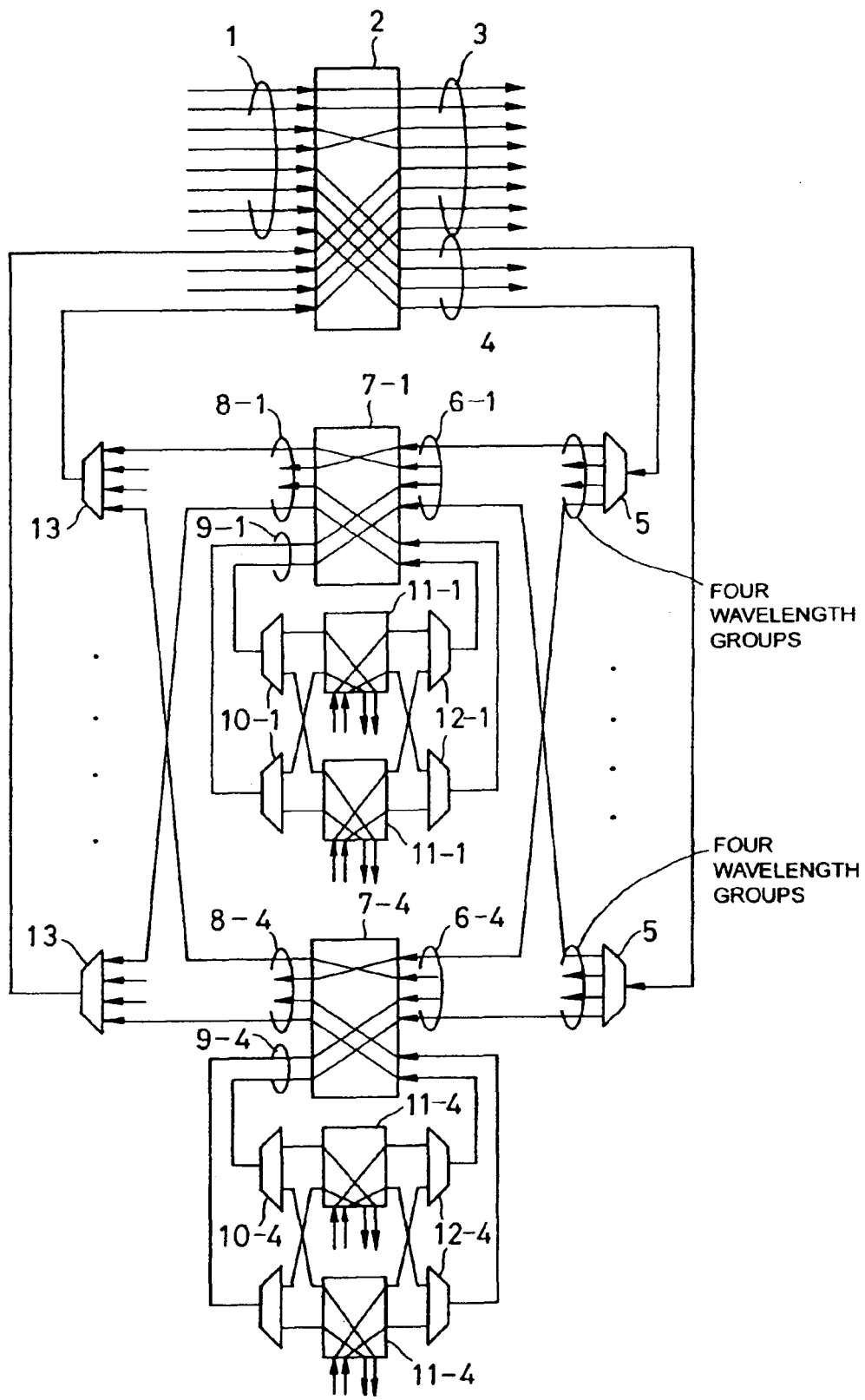
FIG. 2 is an illustration showing an example of block diagram of the optical cross-connecting device employing the construction of the present invention in the case a ratio of the wavelength signals which can be added or dropped is 25%.

More particular embodiment will be discussed with reference to FIG. 2. It is assumed that a wavelength multiplexed signal to be transmitted is consisted of four wavelength groups, and each wavelength group is consisted of two wavelength signals. Moreover, number of the optical fibers 1 to which the wavelength multiplexed signal is input, is assumed to be eight. It is further assumed that four out of eight are output to the optical fibers 4. Then, necessary number of switching elements in the first optical switch 2 is 12×12=144.

Next, four wavelength multiplexed signals output from the optical fibers 4 are divided into four wavelength groups by respective wavelength group demultiplexers 5. Number of the second optical switches becomes four, i.e. 7-1, ..., 7-4. It is assumed that, among four wavelength groups input to the second optical switches 7-1 to 7-4, two wavelength groups are output to respective optical fibers 9-1 to 9-4. Then, total number of switching elements required for the second optical switches 7-1 to 7-4 becomes (6×6)×4=144.

The wavelength groups output from the optical fibers 9-1 to 9-4 are divided into two wavelength signals in respective wavelength demultiplexers 10-1 to 10-4. In the third optical switches 11-1 to 11-4, switching of the same unit of the wavelength signal and adding/dropping of the signal are performed. Then, total number of the switching elements required for the third optical switches 11-1 to 11-4 becomes {(4×4)×2}×4=128. As a result, total number of switching elements necessary for forming the optical cross-connecting device is 144+144+128=416. On the other hand, among all wavelength signals input from the optical fibers in the transmission paths, a ratio of the wavelength signals which can be added and dropped is 25%.

Figure 3:
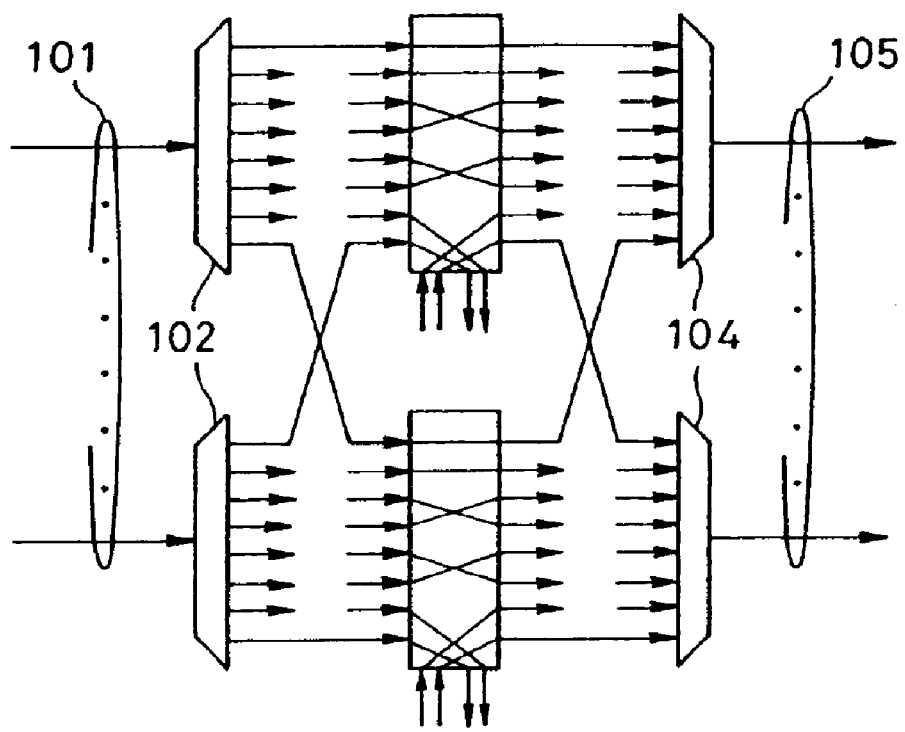
FIG. 3 is an illustration showing an example of block diagram of the optical cross-connecting device employing the conventional construction in the case a ratio of the wavelength signals which can be added or dropped is 25%.

FIG. 3 is a block diagram showing an example of the optical cross-connecting device employing the conventional construction in the case where the ratio of the wavelength signal to be added and dropped is 25%. In this case, total number of the switching element required is (10×10)×8= 800.

For the signal which may be switched per unit of signal having large granularity, by performing switching per the wavelength multiplexed signal or switching per the wavelength group as much as possible, number of signals to be divided into individual wavelength signal can reduce a scale of the switch. On the other hand, the signal only switched per the wavelength multiplexed signal or the signal only switched per the wavelength group may reduce number of optical filters to pass to reduce signal degradation by passing through nodes.

The foregoing embodiment is particularly effective as used in the switching equipment in small or middle size city or the like. In case of the small or middle size city, large proportion of signals pass as they are and quite limited number of signals are only switched.

It should be appreciated that what wavelength or what wavelength group are to be used in each city is determined by concentric calculation by a system managing the network or dispersive calculation by each node, among available wavelength resource.

Figure 4:
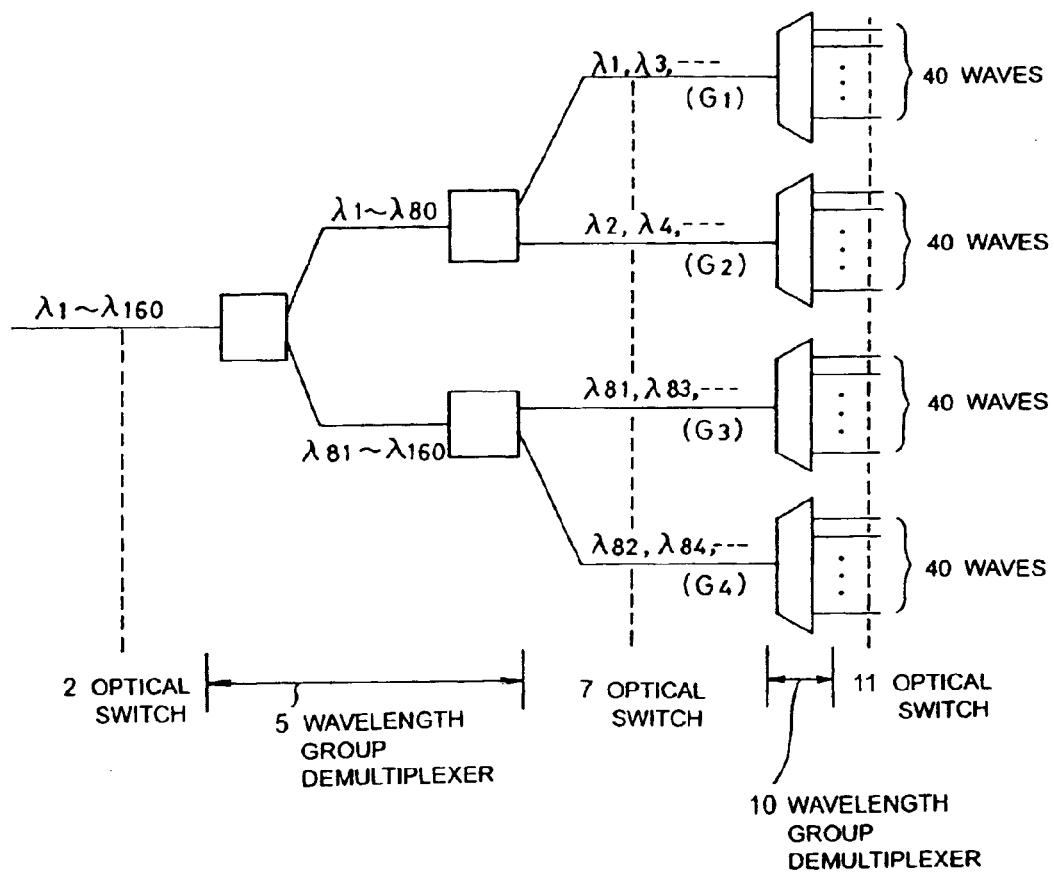
FIG. 4 is a diagrammatic illustration showing a relationship between each wavelength group or wavelength signal of the wavelength multiplexed signal and each component.
Figure 15:
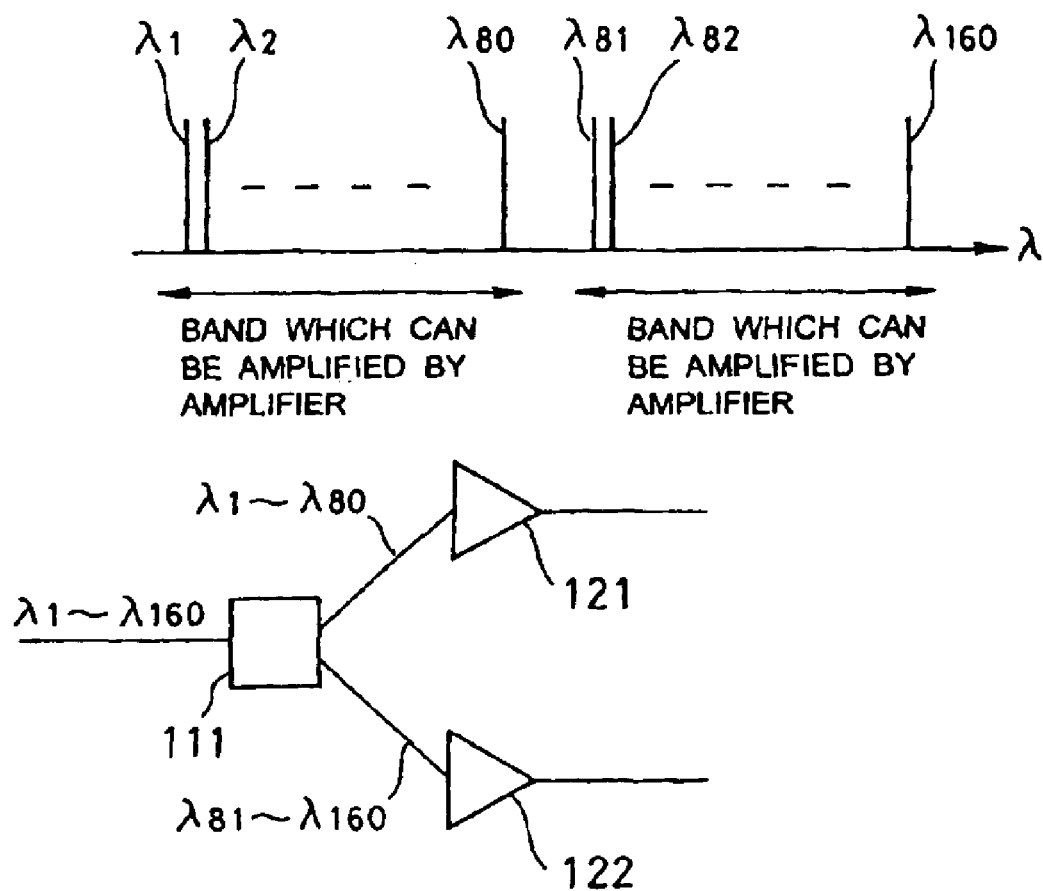
FIG. 15 is an illustration showing an example of generation of the wavelength group.
Figure 16A:
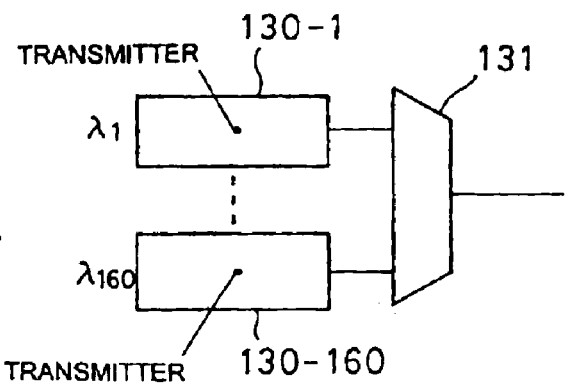
FIGS. 16A to 16C are illustrations showing another example of generation of the wavelength group.
Figure 16B:
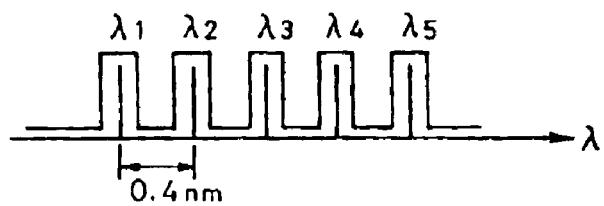
Figure 16C:
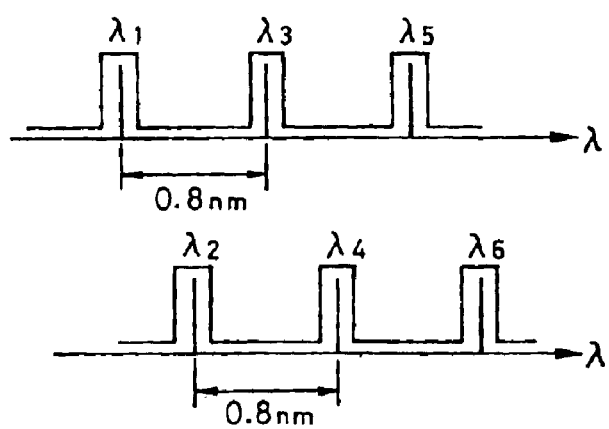
Figure 17:
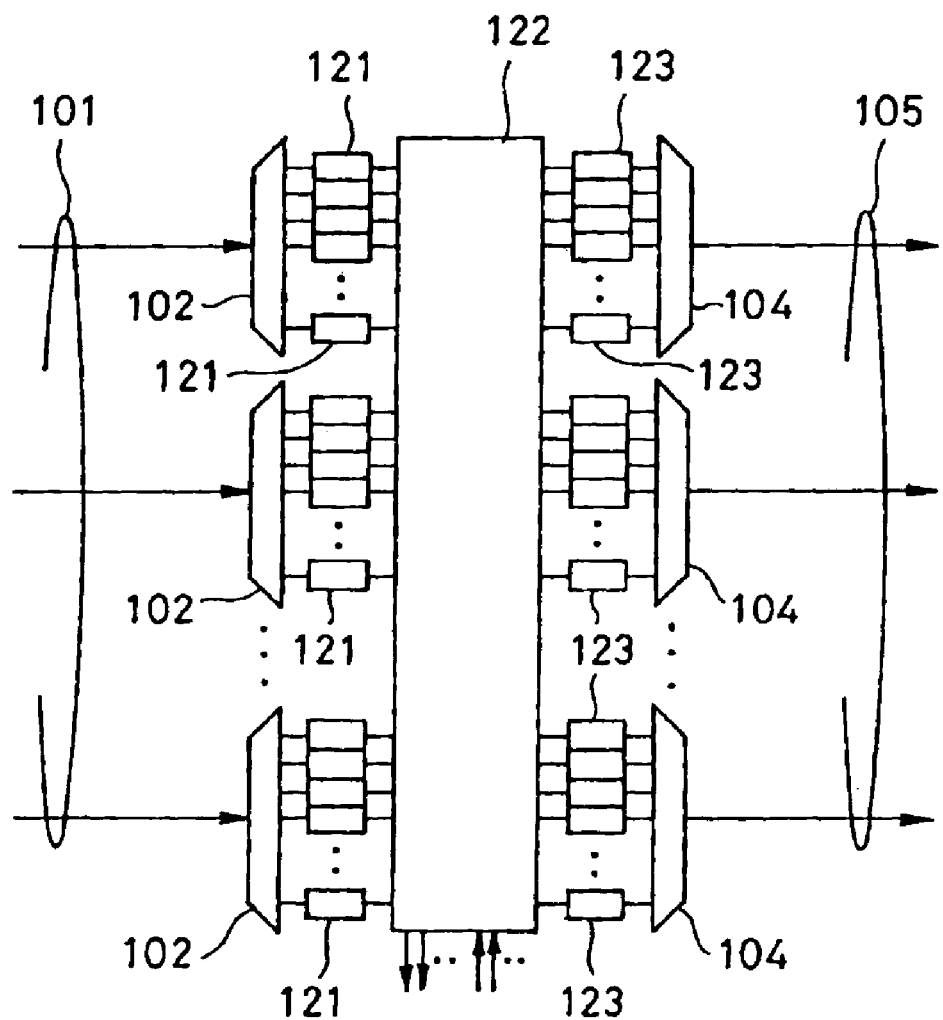
FIG. 17 is a block diagram showing another construction of the typical conventional optical cross-connecting device.

FIG. 4 is a diagrammatic illustration showing a relationship between each wavelength group or wavelength signal of the wavelength multiplexed signal and each component in the case where a hundred sixty wavelength signals of λ1 to λ160 are multiplexed in the optical fiber. One of a plurality of wavelength multiplexed signals in the optical fibers 4 in FIG. 1 is multiplexed with hundred sixty wavelength signals of λ1 to λ160, as shown in FIG. 4. In the wavelength group demultiplexer 5, the wavelength multiplexed signal is divided into four wavelength groups in two stages. In the first stage, as shown in FIG. 15, for example, dividing is performed in a band which can be amplified by an amplifier, and performed to be divided into a wavelength group of λ1 to λ80 and a wavelength group of λ81 to λ160. In the second stage, as shown in FIG. 16, for example, dividing is performed with a filter characteristics of the demultiplexer to divide odd number order wavelengths and even number order wavelengths to obtain wavelength groups G1 to G4. Thus, dividing is performed by the wavelength group demultiplexer 5.

Then, by the optical switch 7, switching of the wavelength groups G1 to G4 is performed. These wavelength groups G1 to G4 are further divided per wavelength signal in the wavelength demultiplexer 10. Switching process and adding/dropping process per the wavelength signal are performed by the optical switch 11.

Figure 5:
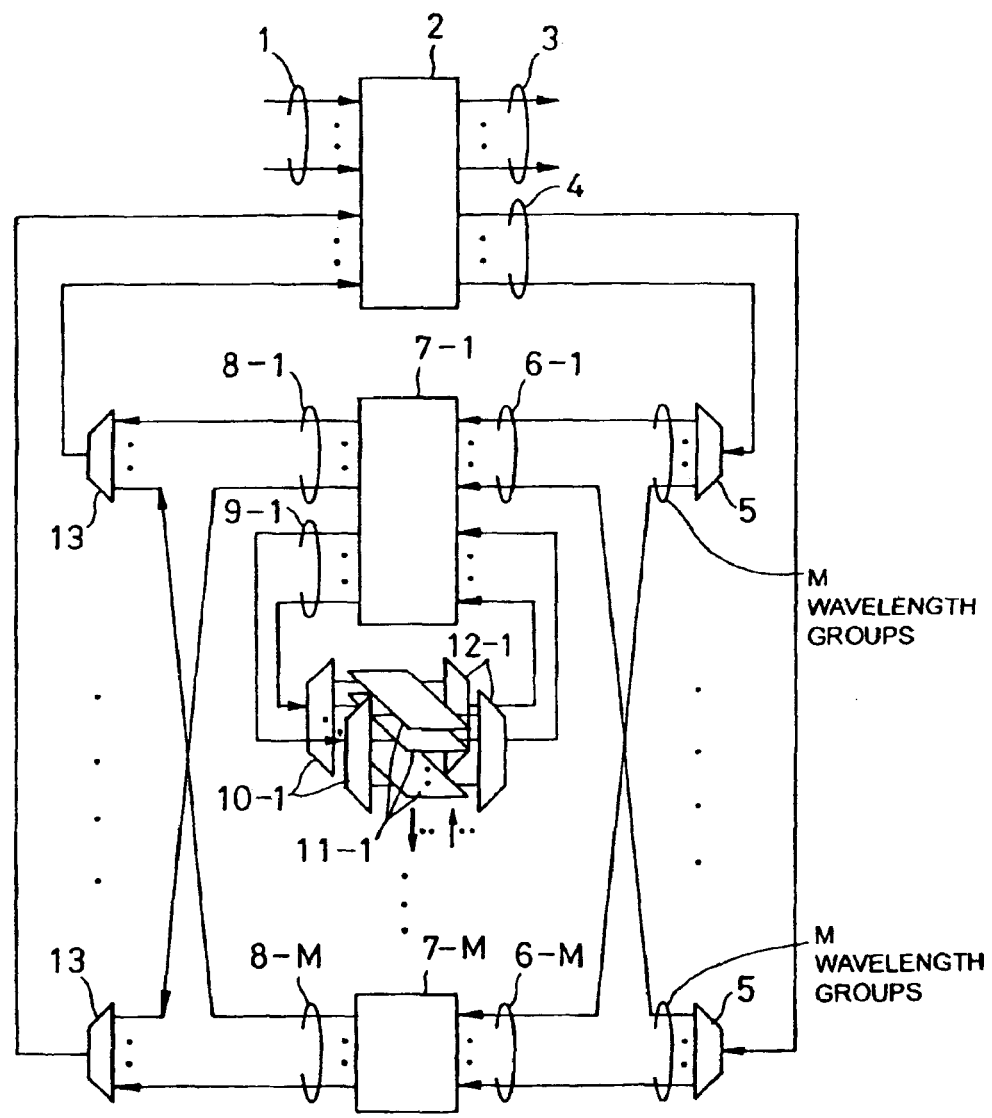
FIG. 5 is a block diagram of the second embodiment of the optical cross-connecting device according to the present invention.

FIG. 5 is a block diagram showing the second embodiment of the optical cross-connecting device according to the present invention. Same portions to those in FIG. 1 will be identified by same reference numerals, and detailed discussion for such common elements will be eliminated in order to avoid redundant discussion in order to keep the disclosure simple enough to facilitate clear understanding of the present invention. In FIG. 5, among a plurality of wavelength groups output from the wavelength group demultiplexer 5, for the (M)th order wavelength group, for example, switching at smaller granularity than that in switching per wavelength group is not performed.

In the node having quite low proportion of the signals to perform switching per wavelength signals or addition/dropping of the signal, the wavelength group to perform switching per wavelength signals or addition/dropping of the signal is preliminarily determined to further reduce scale of the switch. This embodiment is effective as used in the switching equipment in the small city or the like.

Figure 6:
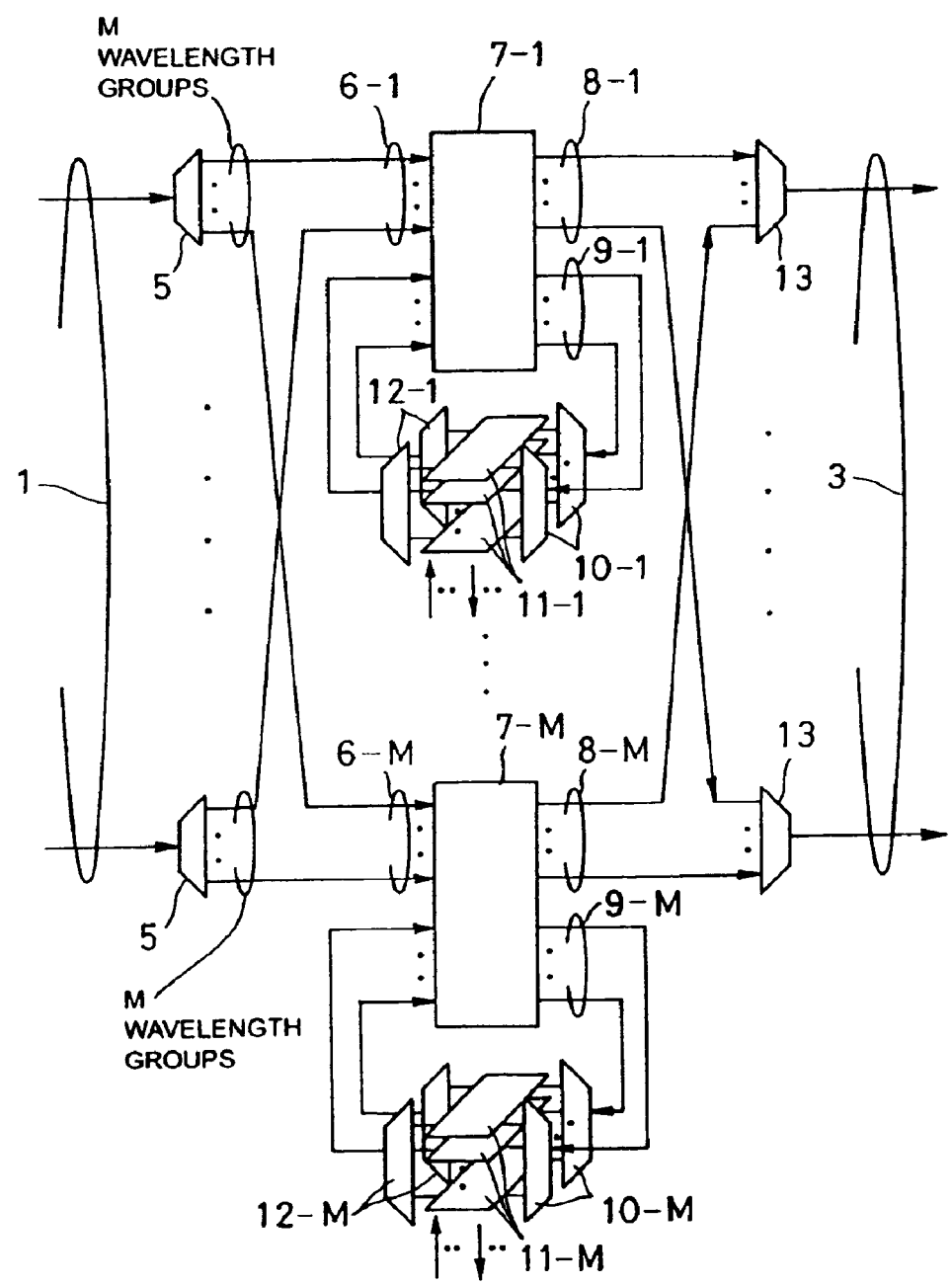
FIG. 6 is a block diagram of the third embodiment of the optical cross-connecting device according to the present invention.

FIG. 6 is a block diagram showing the third embodiment of the optical cross-connecting device according to the present invention. Same portions to those in FIG. 1 will be identified by same reference numerals, and detailed discussion for such common elements will be eliminated in order to avoid redundant discussion in order to keep the disclosure simple enough to facilitate clear understanding of the present invention. In FIG. 6, the wavelength multiplexed signals input from a plurality of optical fibers 1 of the transmission paths are divided into the wavelength groups by respective wavelength group demultiplexers 5. The wavelength groups thus divided are switched per the wavelength group by the second optical switches 7-1 to 7-M. On the other hand, as required, by the third optical switches 11-1 to 11-M, switching per wavelength signal and adding/dropping of the signal are performed.

As set forth above, in the node required switching at a small granularity in certain extent, scale of the switch can be further reduced by preliminarily eliminating the optical switch performing switching per the wavelength multiplexed signal. This embodiment is applicable not only for the switching equipments in the small or middle size city but also for the switching equipment in large city.

Figure 7:
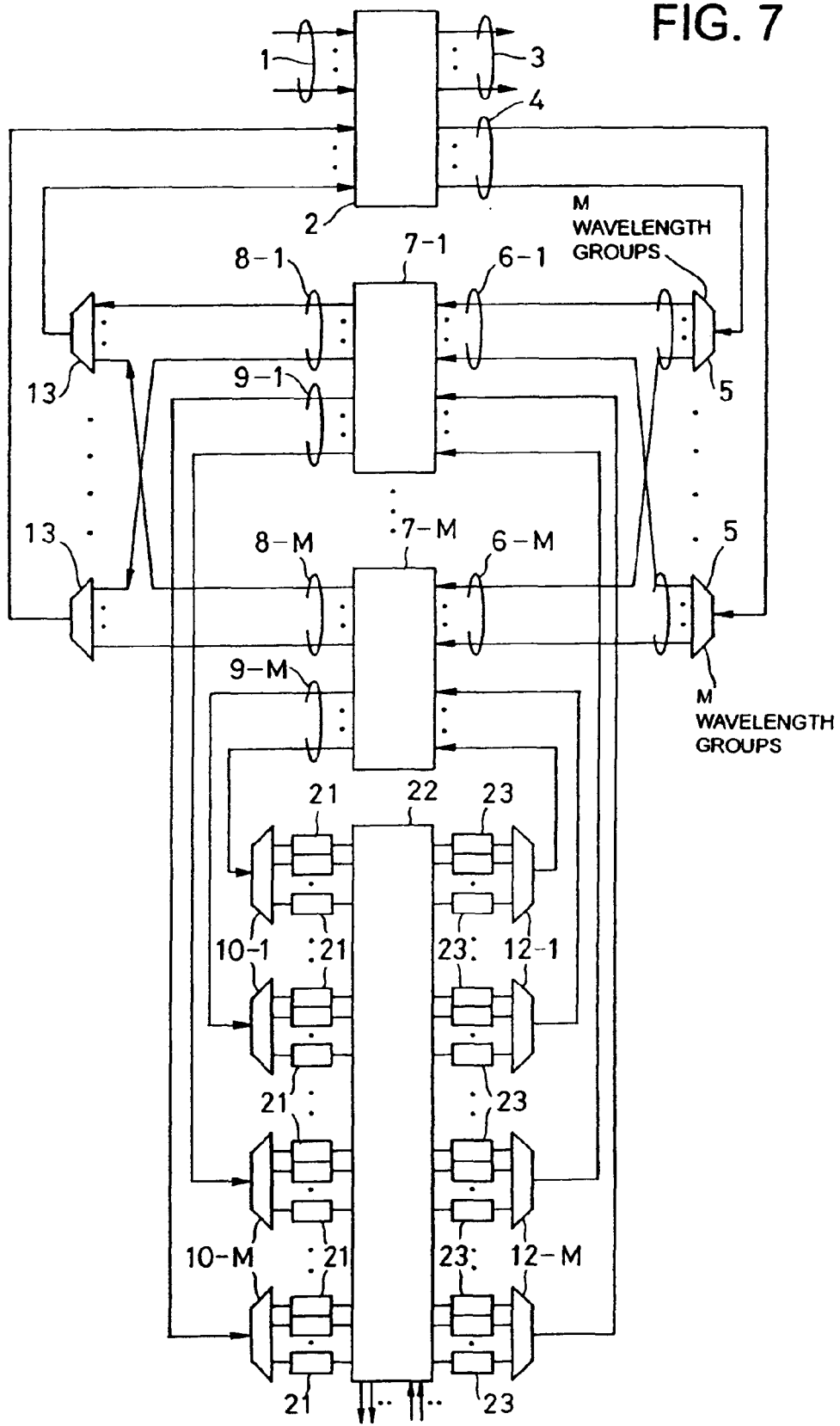
FIG. 7 is a block diagram of the fourth embodiment of the optical cross-connecting device according to the present invention.

FIG. 7 is a block diagram showing the fourth embodiment of the optical cross-connecting device according to the present invention. Same portions to those in FIG. 1 will be identified by same reference numerals, and detailed discussion for such common elements will be eliminated in order to avoid redundant discussion in order to keep the disclosure simple enough to facilitate clear understanding of the present invention. In FIG. 7, individual wavelengths divided by the wavelength demultiplexers 10-1 to 10-M are converted into individual signals all having wavelength ($\lambda 0$) by respective wavelength converters 21. The individual converted signals are input to the third optical switch 22 to be subject switching process and adding/dropping process per individual signal.

The individual signals output from the third optical switch 22 are respectively input to the wavelength converters 23 to be converted into individual wavelength signals. These individual wavelength signals are multiplexed into wavelength groups by the wavelength multiplexers 12-1 to 12-M and input the second optical switches 7-1 to 7-M.

With reference to FIG. 7, discussion will be given for the case where an optical receiver is used in place of the wavelength converter 21. The individual wavelengths divided by the wavelength demultiplexers 10-1 to 10-M are converted into individual electric signals by respective optical receivers 21. The individual electric signals converted are input the third electric switch 22 to be subject of switching process and adding/dropping process per individual signals.

The individual signals output from the third electric switch 22 are input to the individual optical transmitters 23 to be converted into individual wavelength signals. These individual wavelength signals are multiplexed into the wavelength groups by the wavelength multiplexer 7-1 to 7-M.

In case of the construction set forth above, since the wavelength signals passing through the wavelength group demultiplexer/multiplexer and the wavelength demultiplexer/multiplexer are once converted into electric signals (even in wavelength conversion, conversion into the electric signal is performed at first and then conversion into wavelengths), signal degradation by passing through multiple stages of optical filters can be restricted for the signal divided down to the individual wavelength. Furthermore, number of the necessary wavelength converters or wavelength transmitters and receivers can be smaller in comparison with the conventional construction to reduce scale and cost of the apparatus.

Figure 8:
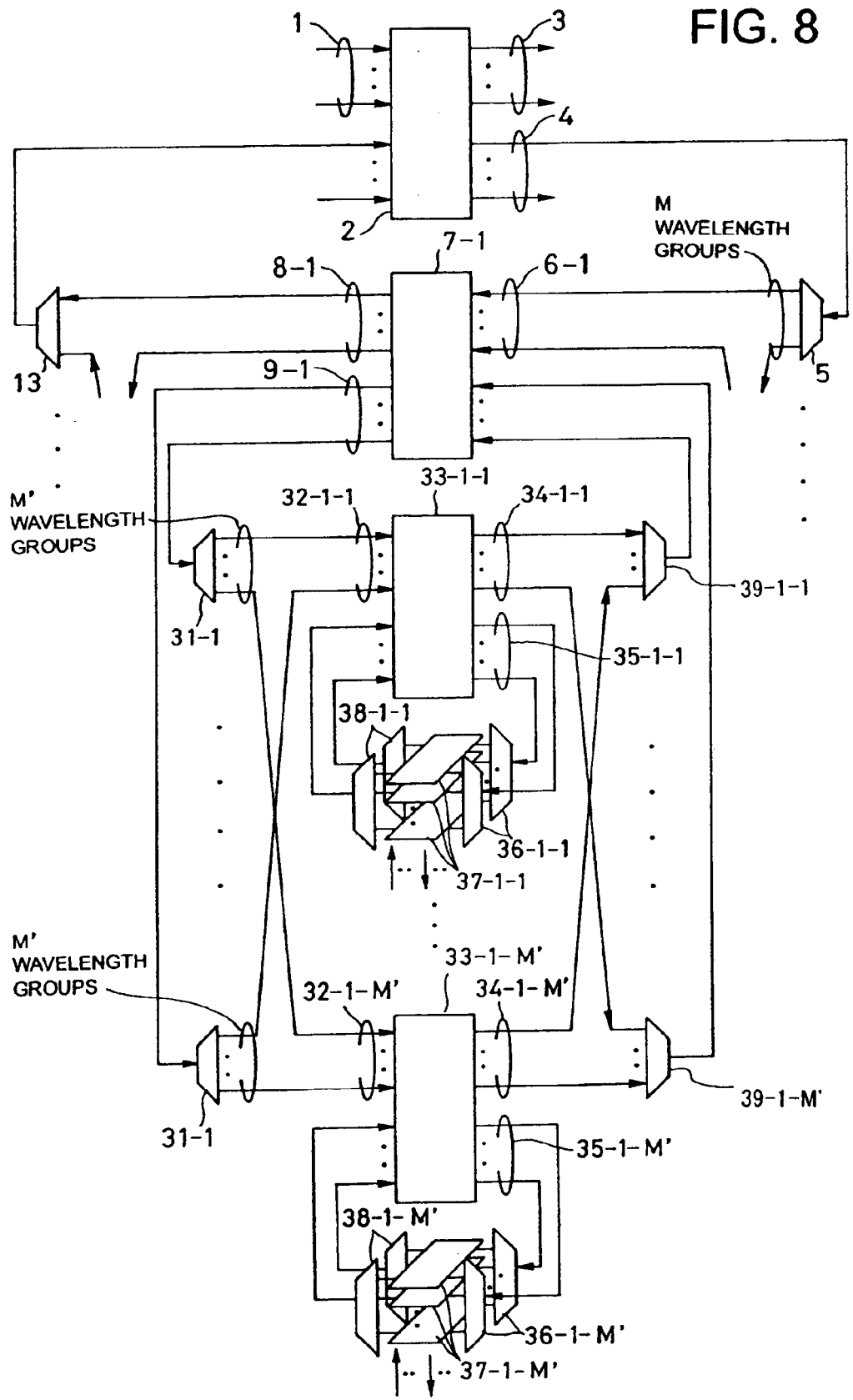
FIG. 8 is a block diagram of the fifth embodiment of the optical cross-connecting device according to the present invention.

FIG. 8 is a block diagram showing the fifth embodiment of the optical cross-connecting device according to the present invention. Same portions to those in FIG. 1 will be identified by same reference numerals, and detailed discussion for such common elements will be eliminated in order to avoid redundant discussion in order to keep the disclosure simple enough to facilitate clear understanding of the present invention. In FIG. 8, discussion will be given only for the first wavelength group output from the first wavelength group demultiplexer 5. It should be appreciated that the following discussion is applicable for other wavelength groups.

A plurality of wavelength groups output from the optical fiber 9-1 is divided into M' in number of wavelength groups of smaller granularity by the second wavelength group demultiplexers 31-1. First wavelength group 32-1-1 to (M)th wavelength group 32-1-M' output from second wavelength group demultiplexers 31-1 are respectively input to the fourth optical switches 33-1-1 to 33-1-M' to perform switching per the wavelength group to be output from the optical switches 34-1-1 to 34-1-M' By this, switching per the wavelength group of smaller granularity becomes possible.

Among wavelength groups output from the fourth optical switches 33-1-1 to 33-1-M', only wavelength groups required switching per wavelength signal are output from 35-1-1 to 35-1-M' and then input to respective wavelength demultiplexers 36-1-1 to 36-1-M' to be divided into individual wavelength signals. The individual wavelength signals output from the wavelength demultiplexers 36-1-1 to 36-1-M are input to respective third switches 37-1-1 to 37-1-M' to be subject switching process per wavelength signal and adding/dropping process of the signal.

The individual wavelength signals output from the third optical switches 37-1-1 to 37-1-M' are multiplexed into wavelength groups having smaller granularity by respective wavelength multiplexers 38-1-1 to 38-1-M', and input to the fourth optical switches 33-1-1 to 33-1-M' and output from the optical switches 34-1-1 to 34-1-M'. A plurality of wavelength groups output from the optical switches 34-1-1 to 34-1-M' are multiplexed into the wavelength multiplexed signal by the second wavelength group multiplexers 39-1-1 to 39-1-M' and again input to the second optical switch 7-1.

Thus, granularity of the wavelength group is made smaller in stepwise to perform switching in each stage to permit switching at respective granularity with relatively small switching scale.

Figure 9:
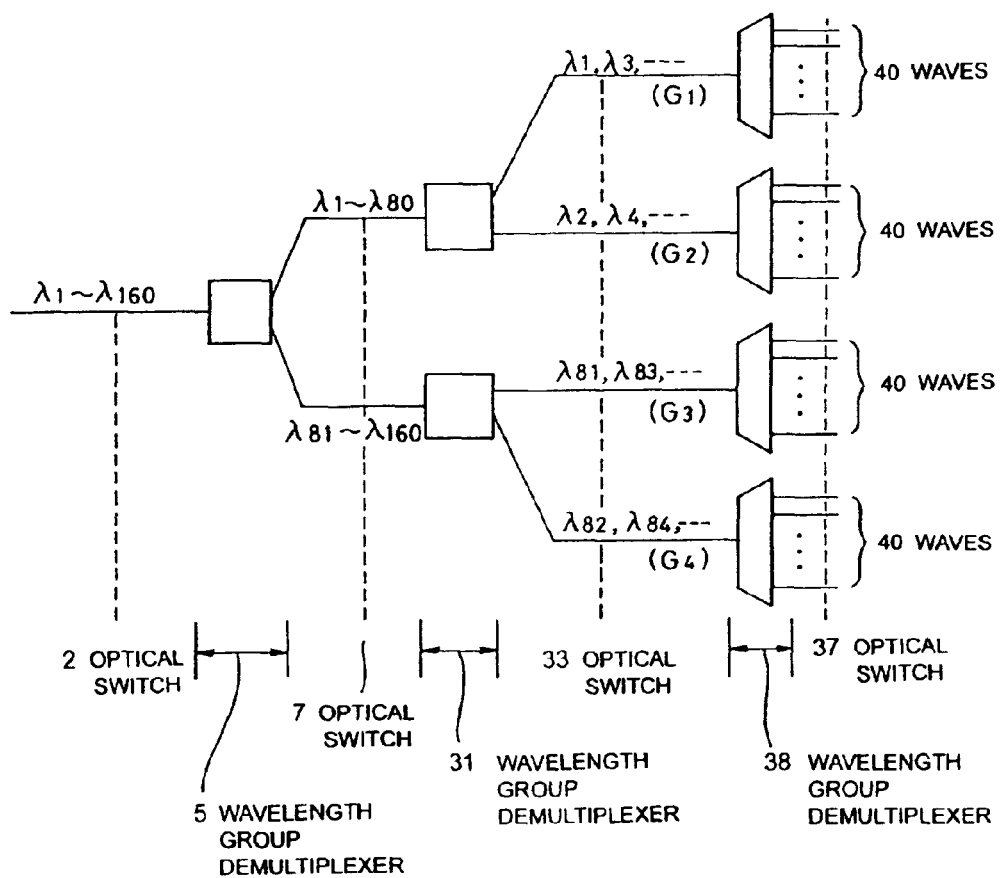
FIG. 9 is a diagrammatic illustration showing a relationship between each wavelength group or wavelength signal of the wavelength multiplexed signal and each component in the construction of FIG. 8.

FIG. 9 diagrammatically shows relationship between the each wavelength groups or wavelength signals of the wavelength multiplexed signal and each component in the construction of FIG. 8. In one of a plurality of wavelength multiplexed signals of the optical fiber 4 of FIG. 8, a hundred sixty wavelength signals of λ1 to λ160 are multiplexed as shown in FIG. 9. For example, as shown in FIG. 15, division in a band which can be amplified by the amplifier is performed to divide into a wavelength group of λ1 to λ80 and a wavelength group of λ81 to λ160. In this stage of wavelength groups, switching process by the optical switch 7 is performed.

Next, as shown in FIG. 16, for example, division depending upon filter characteristics is performed by the wavelength group demultiplexer 31 into groups of odd number order wavelengths and groups of even number order wavelengths to obtain wavelength groups G1 to G4. By the optical switch 33, switching of the wavelength groups G1 to G4 is performed. These wavelength groups G1 to G4 are further divided per wavelength signal in the wavelength demultiplexer 38. Switching process and adding/dropping process per wavelength signal are performed by the optical switch 37.

Figure 10:
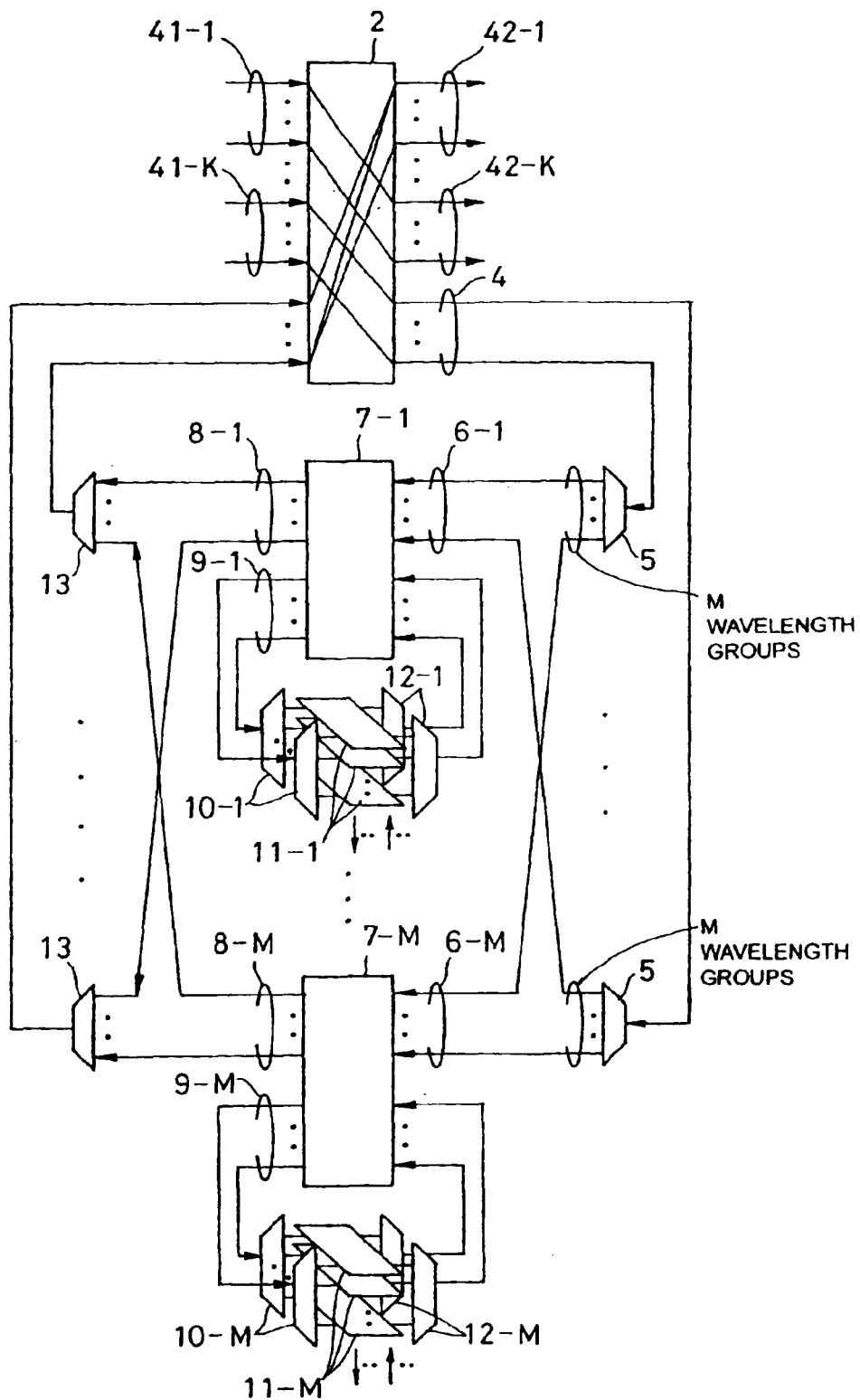
FIG. 10 is a block diagram of the sixth embodiment of the optical cross-connecting device according to the present invention.
Figure 11:
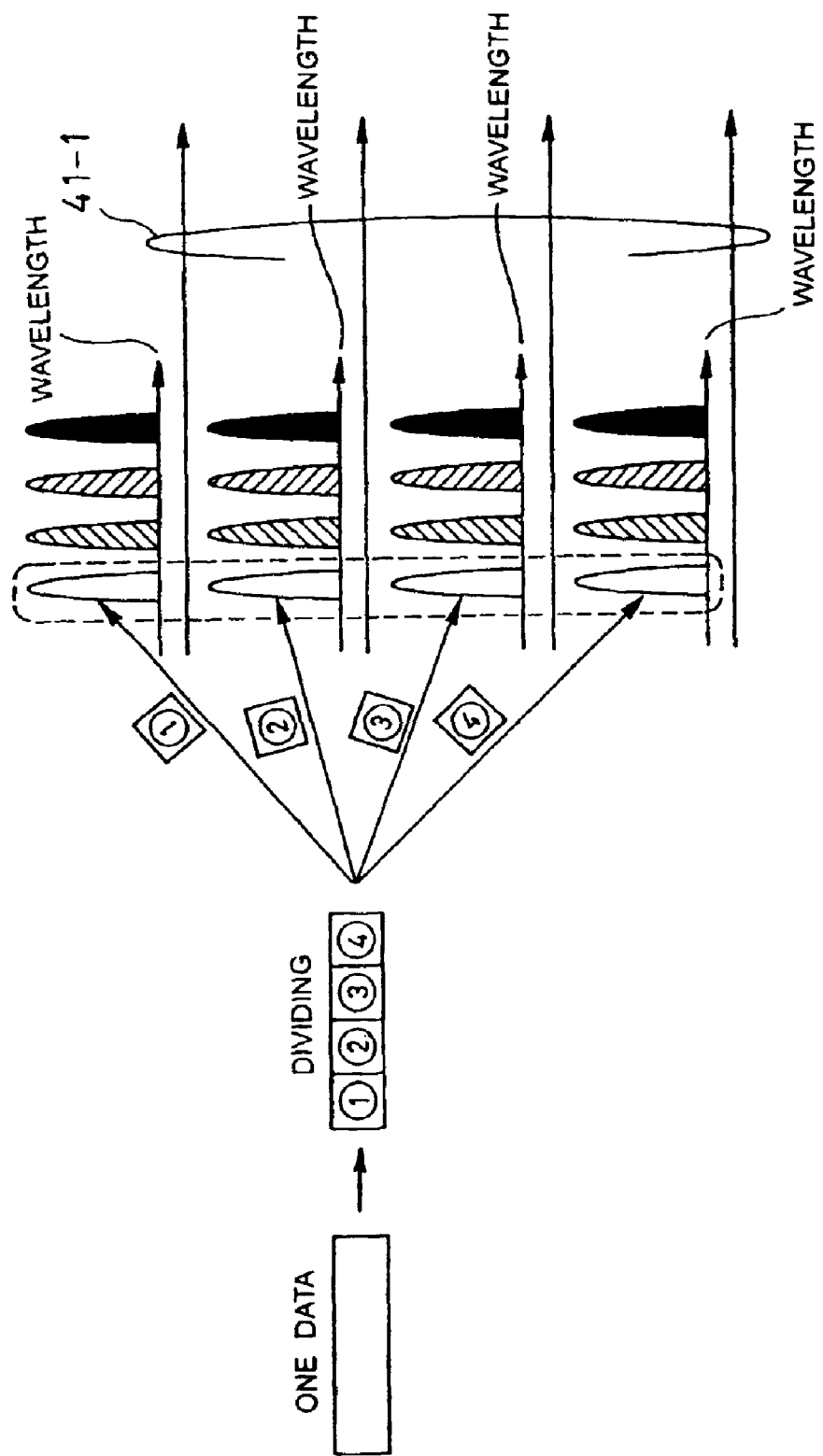
FIG. 11 is an illustration showing an example of a transmission mode of data, to which the sixth embodiment of the optical cross-connecting device according to the present invention is applied.
Figure 12:
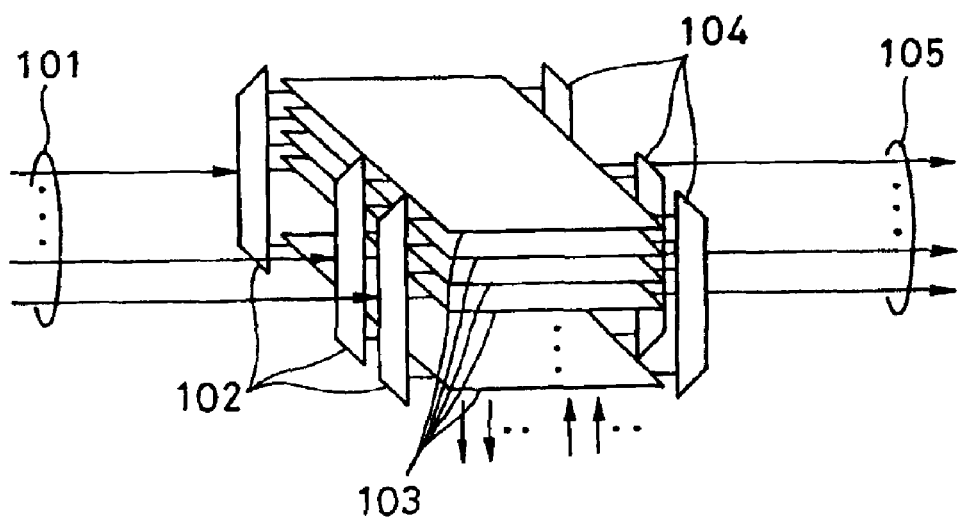
FIG. 12 is a block diagram showing a construction of the conventional typical optical cross-connecting device.
Figure 13:
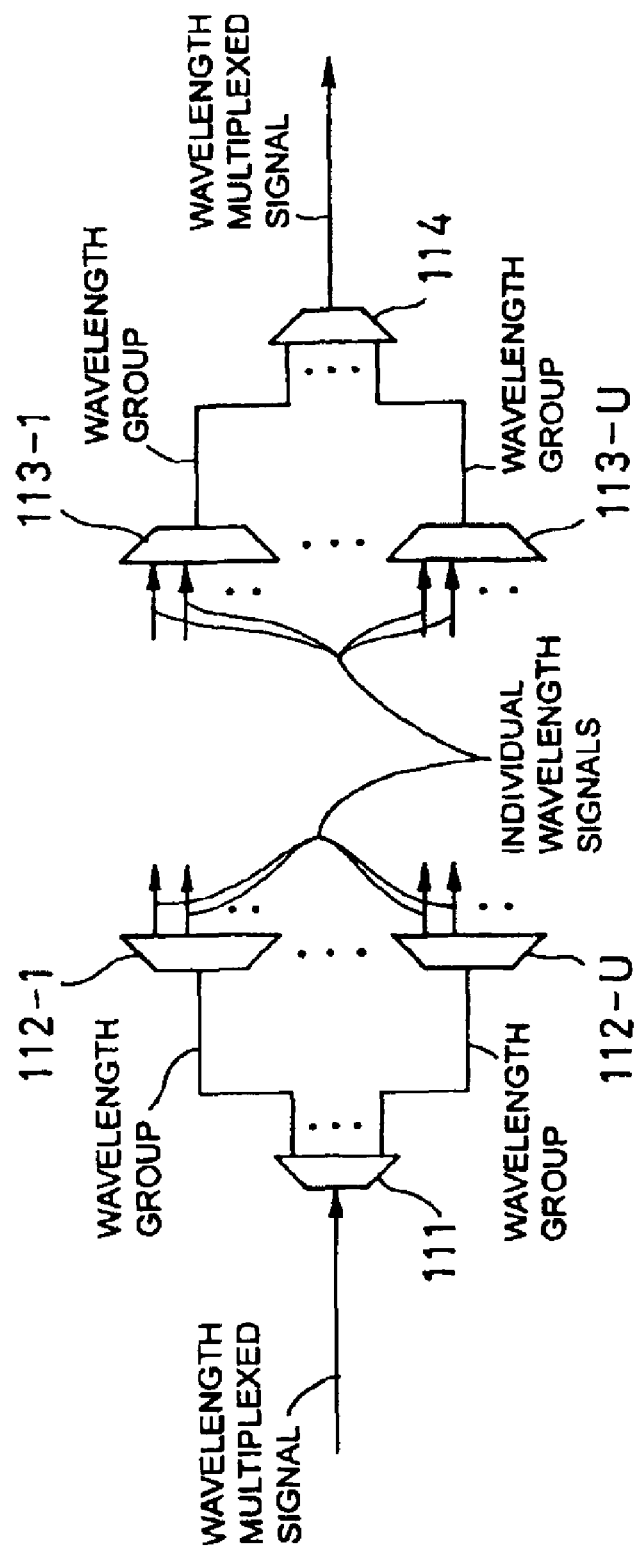
FIG. 13 is an illustration showing a dividing and wavelength multiplexing method of an optical signal in the case where a waveband to be used is high density and wire range.
Figure 14A:
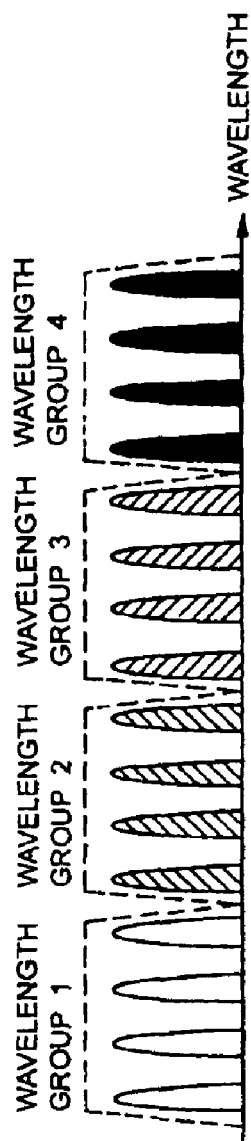
FIGS. 14A, 14B and 14C are illustration showing examples of form of the wavelength groups.
Figure 14B:
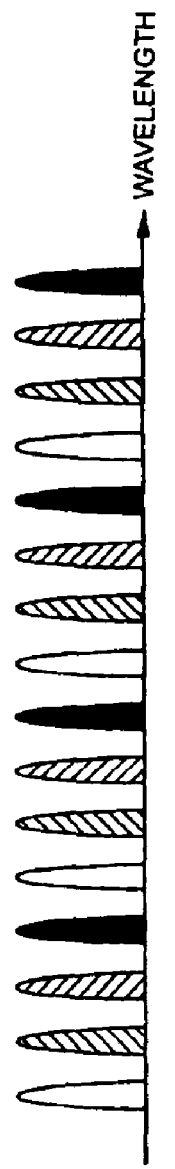
Figure 14C:
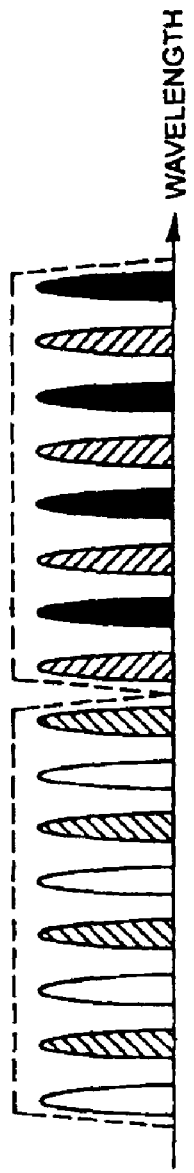

FIG. 10 is a block diagram showing the sixth embodiment of the optical cross-connecting device according to the present invention. Same portions to those in FIG. 1 will be identified by same reference numerals, and detailed discussion for such common elements will be eliminated in order to avoid redundant discussion in order to keep the disclosure simple enough to facilitate clear understanding of the present invention. A plurality of optical fibers in the transmission paths input to the first optical switch 2 are aggregated into a group. In the first optical switch 2, switching per group is performed, and switching in one group is not performed. This is applied to the case where one data to be transmitted is divided into several data and to transmit divided data using different optical fibers, as shown in FIG. 11, for example.

In this case, since it becomes unnecessary to switch the optical fibers within one group, only switching per group is performed in the first optical switch 2 to permit reduction of number of switch elements.

Similarly, even in the second optical switches 7-1 to 7-M and the third optical switches 11-1 to 11-M, the optical fibers not requiring switching are aggregated into a group to perform switching per group to further reduce number of switch elements.

As set forth above, in the present invention, switching of the wavelength multiplexed signals is performed in the first optical switch, switching per wavelength group in the second optical switch is performed for only signals required switching for smaller granularity, and switching per wavelength signals in the third optical switch is performed for only signals required switching for smaller granularity to form the optical cross-connecting device. By this, even when the wavelength multiplexed signal to be transmitted through the optical fiber is high density and wide band, the optical cross-connecting device can be small in scale of a switch. Also, number of optical filters, such as wavelength group demultiplexer/multiplexer or wavelength demultiplexer/multiplexer, to pass the optical signal, can restrict degradation of the signal.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

In the first, second, third, fifth and sixth embodiments, switching between the same wavelength in the third optical switch is discussed. However, switching of the wavelength as shown in the fourth embodiment is also applicable for those embodiments.

What is claimed is:

1. An optical cross-connecting device for switching wavelength multiplexed signals input from a plurality of optical fibers, comprising:
   switching means for switching per wavelength group for a part of a plurality of said wavelength multiplexed signals, said switching means comprising:
   a first optical switch for switching the wavelength multiplex signals;
   first wavelength group demultiplexers for dividing input wavelength multiplexing signals output from the first optical switch into a plurality wavelength groups having first granularity;
   second optical switches for switching, per wavelength group, for only signals having the first granularity;
   second wavelength group demultiplexers for dividing a part of a plurality of wavelength groups output from said second optical switches into a plurality of wavelength groups having a second granularity smaller than said first granularity; and
   third optical switches for switching per wavelength signal and adding/dropping for individual wavelength signals extracted from the groups output from said second wavelength group demultiplexers.

2. An optical cross-connecting device for switching wavelength multiplexed signals input from a plurality of optical fibers, comprising:
   switching means for switching per wavelength group for a part of a plurality of said wavelength multiplexed signals, wherein said switching means comprises:
   a first optical switch for switching per the wavelength multiplexed signal for the wavelength multiplexed signals input from a plurality of optical fibers;
   first wavelength group demultiplexers for dividing wavelength multiplexing signals input from a plurality of said optical fibers into a plurality wavelength groups having first granularity;
   second optical switches for switching per wavelength group for said wavelength groups having said first granularity output from said first wavelength group demultiplexers;
   second wavelength group demultiplexers for dividing a part of a plurality of wavelength groups output from said second optical switches into a plurality of wavelength groups having a second granularity smaller than said first granularity;
   fourth optical switches for switching per wavelength group for a part of a plurality of wavelength groups output from said second wavelength group demultiplexers;
   wavelength demultiplexers for dividing a part of plurality of wavelength groups output from said fourth optical switches into respective indicative wavelength signals; and
   electrical switches for switching per wavelength signal and adding/dropping for individual wavelength signals output from said wavelength demultiplexers, optical receivers for converting individual wavelength signals output from said wavelength demultiplexers into electric signals to input to said electrical switches; and optical transmitters for converting individual electric signals output from said electrical switches into individual wavelength signals and outputting to said wavelength multiplexers.

3. An optical cross-connecting device for switching wavelength multiplexed signals input from a plurality of optical fibers, comprising:

switching means for switching per wavelength group for a part of a plurality of said wavelength multiplexed signals, wherein said switching means comprises:

a first optical switch for switching per the wavelength multiplexed signal for the wavelength multiplexed signals input from a plurality of optical fibers;

first wavelength group demultiplexers for dividing wavelength multiplexing signals input from a plurality of said optical fibers into a plurality wavelength groups having first granularity;

second optical switches for switching per wavelength group for said wavelength groups having said first granularity output from said first wavelength group demultiplexers;

second wavelength group demultiplexers for dividing a part of a plurality of wavelength groups output from said second optical switches into a plurality of wavelength groups having a second granularity smaller than said first granularity;

fourth optical switches for switching per wavelength group for a part of a plurality of wavelength groups output from said second wavelength group demultiplexers;

wavelength demultiplexers for dividing a part of plurality of wavelength groups output from said fourth optical switches into respective indicative wavelength signals; and third optical switches for switching per wavelength signal and adding/dropping for individual wavelength signals output from said wavelength demultiplexers.

4. An optical cross-connecting device as set forth in claim 3, wherein said switching means further comprises:

wavelength multiplexers for multiplexing individual wavelength signals output from said third optical switches into wavelength groups having said second granularity to input to said fourth optical switches;

second wavelength group multiplexers for multiplexing wavelength groups other than a part of wavelength groups output from said fourth optical switches into wavelength groups having said first granularity to input to said second optical switches; and first wavelength group multiplexers for multiplexing the wavelength group other than said part of the wavelength groups and output from said second optical switches into single wavelength multiplexed signals to input to said first optical switch.

* * * * *